United States Patent [19]
Perilleux et al.

[11] Patent Number: 5,880,477
[45] Date of Patent: Mar. 9, 1999

[54] METHOD OF REAL TIME CONTROL OF IONIZING RADIATION DOSE RATE AND DEVICE FOR USING SAME

[75] Inventors: Philippe Jean-Pierre Perilleux, Saint Medard en Jalles; Robert Soubie, Gradignan, both of France

[73] Assignee: Aerospatiale Societe Nationale Industrielle, Paris Cedex, France

[21] Appl. No.: 659,930

[22] Filed: Jun. 7, 1996

[30] Foreign Application Priority Data

Jun. 7, 1995 [FR] France ................................ 95 06932

[51] Int. Cl.⁶ .................................................. H01J 49/44
[52] U.S. Cl. ..................................... 250/492.3; 250/492.1
[58] Field of Search ............................. 250/492.3, 492.1, 250/397, 398, 399

[56] References Cited

U.S. PATENT DOCUMENTS

| | | | |
|---|---|---|---|
| 3,965,434 | 6/1976 | Helgesson | 250/492.3 |
| 4,689,488 | 8/1987 | Beziers | 250/492.3 |
| 4,975,585 | 12/1990 | Asai | 250/385.1 |
| 5,635,714 | 6/1997 | Nablo et al. | 250/492.3 |

OTHER PUBLICATIONS

*Nuclear Instruments and Methods*, vol. 196, No. 2/3, 1982, Amsterdam, Netherlands, pp. 469–475, XP002003446, T. Yamamoto et al., "Dosimetry of Pulsed X–rays of High Exposure Rate Generated by an Electron Linear Accelerator with an Ionization Chamber."

*Primary Examiner*—Kiet T. Nguyen
*Attorney, Agent, or Firm*—Young & Thompson

[57] ABSTRACT

A method and apparatus for real time control of the dose rate of particles or ionizing radiation, especially X-ray radiation, generated from an electron linear gun and applied to objects for various purposes. The method involves sampling continuously, using an appropriate ionization chamber having planar electrodes, placed in the field of particles or ionizing radiation, the current for collecting the load between the electrodes. Thus, the instantaneous does rate of the radiation is represented by the collecting current. Using an appropriate shielded conducting system, the collecting current is directed to an amplification and measurement circuit arranged outside of the irradiation zone. The intensities of the current are translated into dose rate values. The does rate values are then processed and/or displayed and/or recorded. The invention can be applied to the polymerization of resins of composite materials.

20 Claims, 4 Drawing Sheets

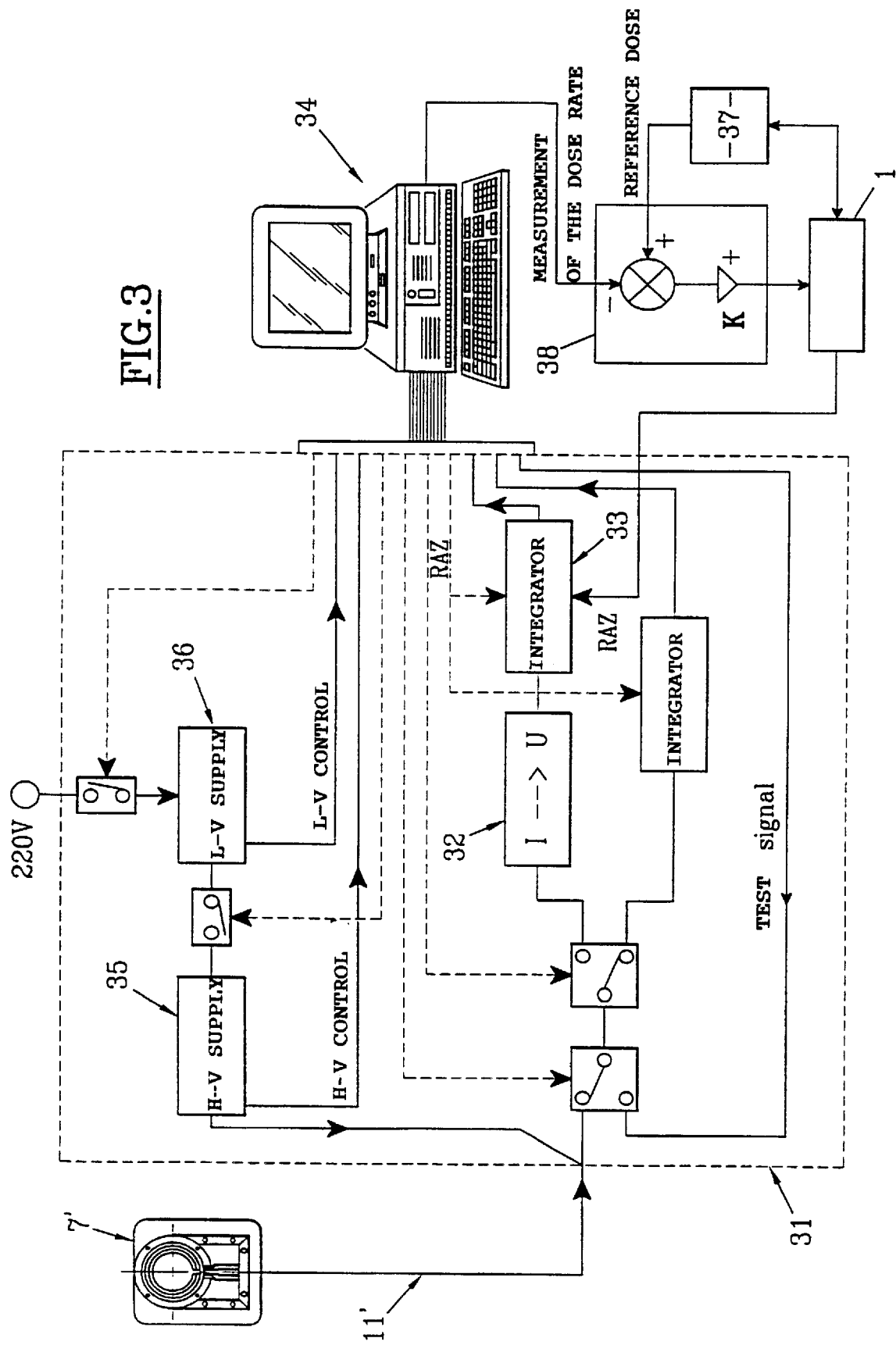

METHOD OF REAL TIME CONTROL OF IONIZING RADIATION DOSE RATE AND DEVICE FOR USING SAME

BACKGROUND OF THE INVENTION

1. Field of the Invention

The present invention relates to the radiation of objects by ionizing particles and/or ionizing radiation generated from an electron linear accelerator more commonly referred to as an electron gun, and more particularly aims at the real time control, i.e., during the ionization, of the dose rate of the radiations applied to objects.

Such radiations and particle beams are commonly used for the polymerization or cross-linking of resins, directly by the action of the electron beam generated by the gun, or indirectly by an X-ray radiation generated by a target placed in the electron beam, of photocrosslinkable resins involving a composite material, or to ensure the sterilization, by means of X-rays or electrons, for the purpose of preserving foodstuffs or the sterilization of medical instruments.

2. Background and Material Information

Although the present invention is subsequently described in its application to the polymerization of resins involving composite materials constituting all or part of the treated element or structure used especially in the fields of automobile, aeronautics or space. Other fields of application are involved or envisioned, such as the sterilization and/or the preservation of foodstuffs or other products or objects, in particular.

In the field of polymerization by ionization of composite materials, one uses an electron gun associated with a retractable tungsten target which, when interposed in the electron beam of the gun, makes it possible to generate a secondary X-ray radiation.

The electron irradiation of the element constituted, totally or partially, of a composite material, namely, resin-impregnated mineral or synthetic fibers, is carried out for composite thicknesses less than about 25 mm, whereas the X-rays are used for greater thicknesses up to about 300 mm.

Although control of the power of the electron accelerator is effected prior to any polymerization operation, in a very accurate manner, by means of a retractable calorimeter, this control is not feasible during the ionization, and there is currently no means for controlling the dose rate sent on the composite material.

It is fundamental to subject the material to the action of a sufficient dose of radiation, in order to suitably cross-link the resins or the radiation-hardenable products falling within the composition of the element to be treated. This dose is the quantity of energy that is necessary to completely cross-link or polymerize the treated product. It defines a general effect, independently of the time required to produce it. It is therefore necessary to properly determine and control the dose rate that characterizes the effect produced in the time unit, as well as the time for applying this dose rate.

This problem related to the dose rate control is particularly crucial when using the X-ray radiation. x-ray radiation allows for penetrations that are much more substantial than those of the electron radiation, but overdoses the surface of the element to be treated, if one desires to obtain the sufficient dose of irradiation at a given depth.

Furthermore, the necessary doses for the polymerization or cross-linking of resins of the element to be treated are resin-dependent and vary to a large extent, for example between 2 and 10 Mrad, the desired dose being obtained by playing with the two factors: time and dose rate.

The conventional industrial process for irradiating an element made of a composite material consists of determining, from charts taking into account the geometry and the nature of the element, a polymerization cycle during which the profile of the irradiation curve, i.e., the variations of the dose rate, will develop.

However, the above-mentioned prior control of the power of the electron accelerator does not guarantee, especially in the case of an X-ray irradiation, that the necessary doses will be actually sent to the various portions of the element along the profile of the pre-established irradiation curve, because variations or "misfires", due to missing pulses, can occur in the power of the electron gun.

The quality control of the conventional process consists of verifying, after the irradiation of the element, that any point located in the thickness of the element has received at least a certain dose of radiation, this verification being carried out, in the known manner, by various systems of dosimetric films.

This is a method of control a posteriori i.e., from the cause to the effect that is reasonably accurate and reliable, but it would be more advisable to be able to control the dose rate values in real time, i.e., during the ionization of the element, in order to verify that the irradiation profile of the polymerization cycle is followed, so as to carry out the quality control of the element while irradiating it, thus avoiding the traditional control a posteriori and, in particular, to possibly rectify the local irradiation acting on the electron gun to prevent a temporary drop in the operation mode, for example.

SUMMARY OF THE INVENTION

An object of the present invention involves means capable of obtaining such real time control of the dose rate of such ionizing radiation.

To this end, an object of the invention is a method of real time control of the dose rate of ionizing radiation, especially X-ray radiation, generated from an electron linear accelerator and applied to objects for various purposes, wherein the invention includes:

sampling continuously, by means of an appropriate ionization chamber having planar electrodes, placed in the field of the ionizing radiation, the current for collecting the loads between the electrodes, so as to obtain a representation of the instantaneous dose rate of the radiation;

directing, by means of an appropriate shielded conducting system, the collecting current to an amplification and measurement circuit arranged outside of the irradiation zone and translating the intensities of the current into dose rate values; and processing and/or displaying and/or recording these dose rate values.

According to an application of this method to the polymerization of resins of the composites, one compares the development of the dose rate values with predetermined dose rate values according to an irradiation cycle established as a function of the element or structure to be treated, and one detects the possible differences between the programmed rates and the detected rates, greater or less than predetermined thresholds.

Advantageously, in order to optimize the irradiation and control process, an ultimate step of the method includes controlling the electron accelerator, as a function of the differences detected, in view of preventing variations in the operating mode thereof.

According to a characteristic of the method of the invention, one splits, on the one hand, the sampling of the useful signal, namely, the load collecting current generated in the ionization chamber and, on the other hand, its treatment and especially its amplification, in order to carry out this treatment outside of the irradiation zone in which this chamber is located.

Indeed, the ionization chamber is located in an environment that is very polluted electromagnetically due to the presence of the electron gun and of substantial powers used for the electron and/or X-ray irradiation, and the current for collecting the loads of the chamber, which is extremely weak, is not exploitable in situ.

According to the invention, this current is directed out of the irradiation zone, by means of an appropriate shielded conducting system, preferably a triaxial cable, for example, of which the central conductor directs the signal to be processed.

In the case of irradiation by X-rays generated by a target, especially made of tungsten, the ionization chamber is preferably placed in the backscattering lobe of the target such that the ionization chamber does not overshadow the objects being treated.

In the case of electron irradiation, the box of the ionization chamber is advantageously made of an appropriate metal such aluminum or, even better, tungsten. The box then serves as a target that generates an X-ray radiation captured by the chamber.

Another object of the invention is a device for implementing the above method, wherein it includes:

- an ionization chamber of the type having planar electrodes, on the one hand; and
- an assembly connected to the ionization chamber by means of a directing shielded conducting device having an appropriate length and resisting X-ray radiation, the assembly including an amplification stage, a signal processing stage and an exploitation means constituted, for example, of display, visualization, recording, and/or computerized means, on the other hand.

Preferably, the processing stage will be designed and associated with a micro-controller or with a micro-computer so as to enable a control of the dose rates versus time, a comparison of these rates with those that are preestablished and programmed for an irradiation cycle, a calculation of the mean value, and possibly a control of the electron gun in view of correcting the shot in the case of temporary variations in the operation mode of the gun, for example.

BRIEF DESCRIPTION OF DRAWINGS

Other characteristics and advantages of the method of the invention will become apparent from the following description of an embodiment that is only provided by way of non-limiting example, with reference to the annexed drawings, in which:

FIG. 3 is a block diagram of a second embodiment of the invention involving control by micro-computer;

DETAILED DESCRIPTION OF THE PREFERRED EMBODIMENTS

Figure 1:
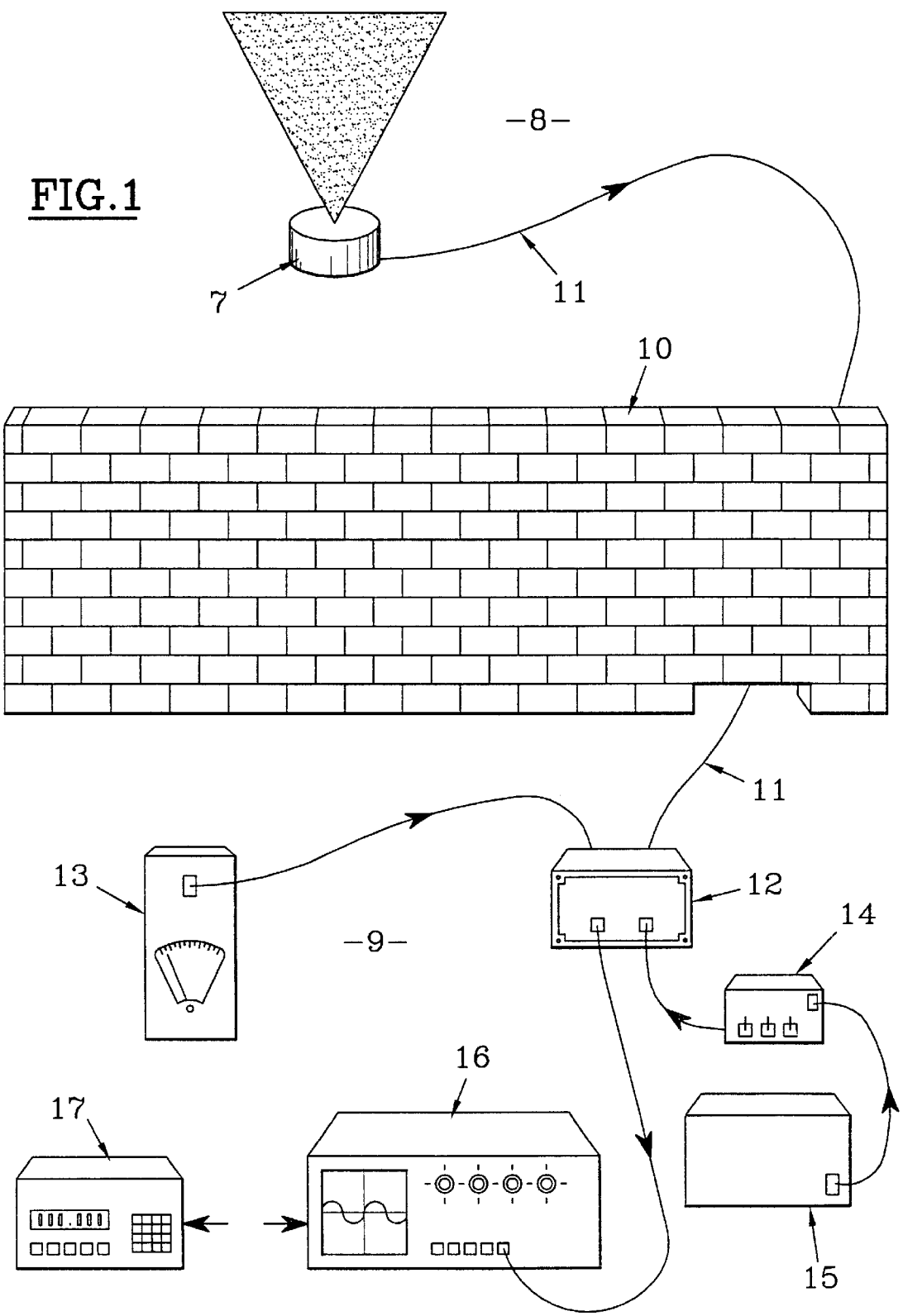
FIG. 1 is a diagram of a device for the real time control of the dose rate of X-ray irradiation of objects made of composite materials, according to a first simplified embodiment.

FIG. 1 schematically shows a first embodiment of a device for implementing the method of the invention intended for the real time control of the dose rate of X-ray irradiation of objects made of composite materials.

By object is meant an element, simple or complex, with variable size, integrally constituted of a composite material, or formed of portions only some of which are made of a composite material.

The irradiation, for the purpose of polymerization or cross-linking of the resin of the composite material, is carried out by means of an electron gun sending an electron beam to the object to be treated, directly or through an interposed target which generates a secondary X-ray radiation received by the object.

Figure 2:
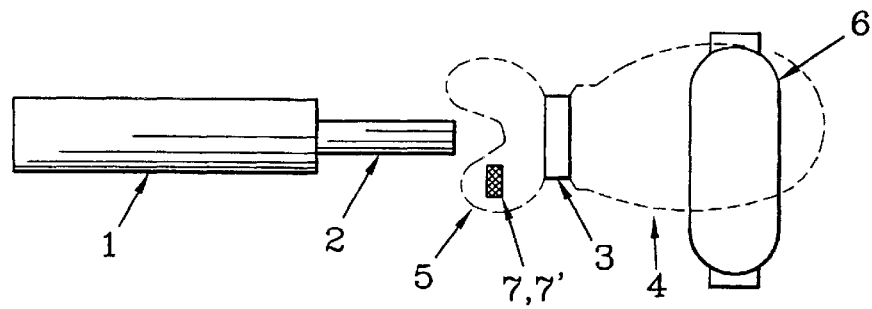
FIG. 2 schematically shows the positioning of the ionization chamber with respect to the electron gun and to the object to be treated.

FIG. 2 illustrates, very schematically, a top view of an electron gun 1 with its outlet horn 2 in front of which a target 3 generally made of tungsten is placed.

The reference numeral 4 represents the main lobe of the field of the secondary X-ray radiation coming from the target 3, and the numeral 5 represents the X-ray radiation back-scattering lobe. The numeral 6 represents the object to be treated, for example, a shell with curved ends of a vessel made of a composite material, with a horizontal axis perpendicular to the axis of the gun 1.

For more detail on the ionization polymerization of such objects by electron or X-ray radiation, one can refer to EP-0.165.118 and FR-94 14881 filed by the Applicant.

In an installation of the type of FIG. 2, the beam of accelerated electrons emitted by the gun typically has the form of a tube with a diameter of about 20 mm, and this beam is provided with a scanning movement in the vertical plane at a frequency on the order of 600 Hz, for example.

The gun 1 operates in a pulsed mode and delivers a power that can vary between 1.5 and 20 or 25 Kw, each pulse lasting about ten microseconds, and the repetition frequency varying between 50 Hz and 600 Hz. The energy spectrum is constituted by a line at 10 MeV.

During the use of the target 3, which is retractable, to generate an X-ray radiation, the energy spectrum is between 0 and 5 MeV.

It is to be understood that the environment close to the gun 1 and to the target 3 is particularly polluted electromagnetically because of the various sources of interferences of the ambient medium (presence of electrons, X-ray radiation, ozone, secondary electromagnetic effects such as, for example, those generated by the rise in the power of the accelerator at each pulse) and of the power levels involved.

In view of a measurement, even approximate, of the dose rate of the electron or X-ray radiation, it is not possible to place, in the radiation field, conventional sensors that are not adapted to this type of environment and to the energy levels used.

The only known techniques for controlling the adequacy of the irradiation of the object to be treated involve, as states in the Background of the Invention, a posterior controls having all of the disadvantages and constraints implied.

To overcome this, the invention proposes a method of real time control of the dose rate of particles or ionizing radiation, especially X-ray radiation, generated from an electron linear gun and applied to objects for various purposes, whereby the method includes:

sampling continuously, by means of an appropriate ionization chamber of the type having planar electrodes, placed in the field of the ionizing radiation, the current for collecting the loads between the electrodes, so as to obtain a representation of the instantaneous dose rate of the radiation;

directing, by means of an appropriate shielded conducting system, the load collecting current to an amplification and measurement circuit arranged outside of the irradiation zone and converting the intensities of the current into dose rate values; and processing and/or displaying and/or recording these dose rate values.

FIG. 1 illustrates an embodiment of this method.

Thus, FIG. 1 schematically shows an ionization chamber 7 of the type having planar electrodes and placed in the X-ray radiation field, for example, in the backscattering lobe 5, as illustrated in FIG. 2.

The chamber or sensor 7 is thus located in the irradiated zone designated by the reference numeral 8 in FIG. 1, that has been separated artificially from a so-called neutral zone 9 by a barrier or a fictitious wall 10.

According to the invention, the sensor 7 is constituted of a simple set of electrodes delivering a signal constituted by the load-collecting current generated by the flow of particles of the X-ray radiation crossing the inter-electrode space. This signal is first directed in a neutral zone 9 to be amplified and processed therein. To this end, the linkage between the zones 8 and 9 is ensured by a shielded conducting system preferably constituted by a triaxial cable 11.

The cable 11 directs the signal of the sensor 7 to an amplification-processing unit 12 connected to a high-voltage supply 13, to a control box 14 with a low-voltage supply 15, and to an oscilloscope 16.

Of course, the triaxial cable 11 brings the appropriate polarizing voltage to the electrodes of the sensor 7.

Alternatively or complementarily to the oscilloscope 16, a measurement display multimeter 17 is shown, the apparatuses 16 and 17 being capable of being completed advantageously by a graphic recorder (not shown).

Figure 5:
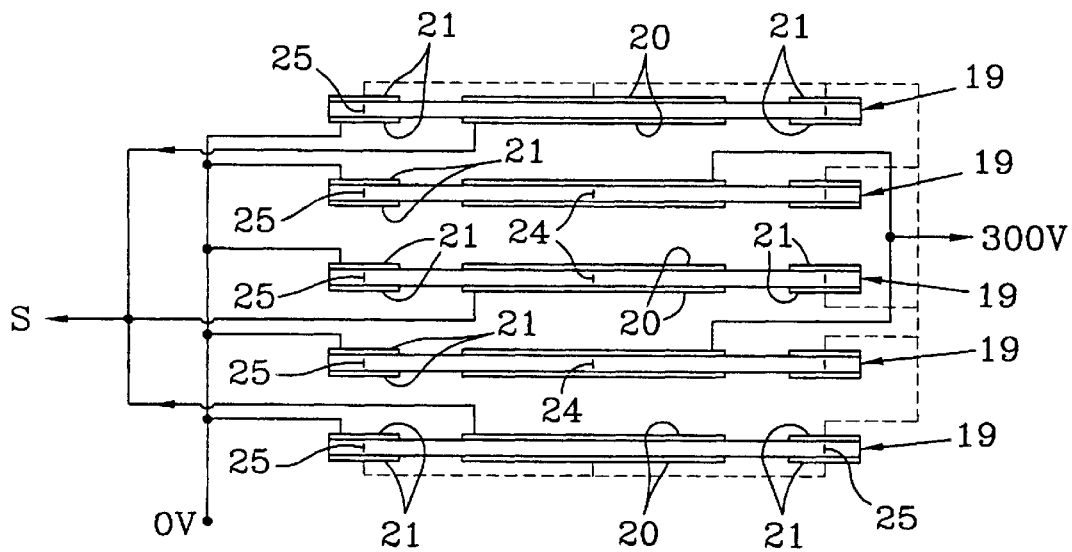
FIG. 5 is a schematic view of the stack of electrodes constituting the ionization chamber.
Figure 6:
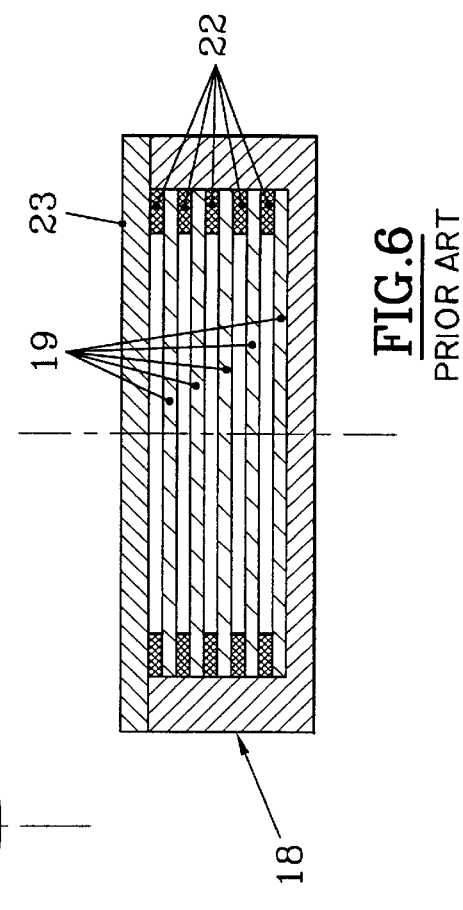
FIG. 6 is a schematic cross-sectional view of the stack of electrodes in its box.
Figure 7:
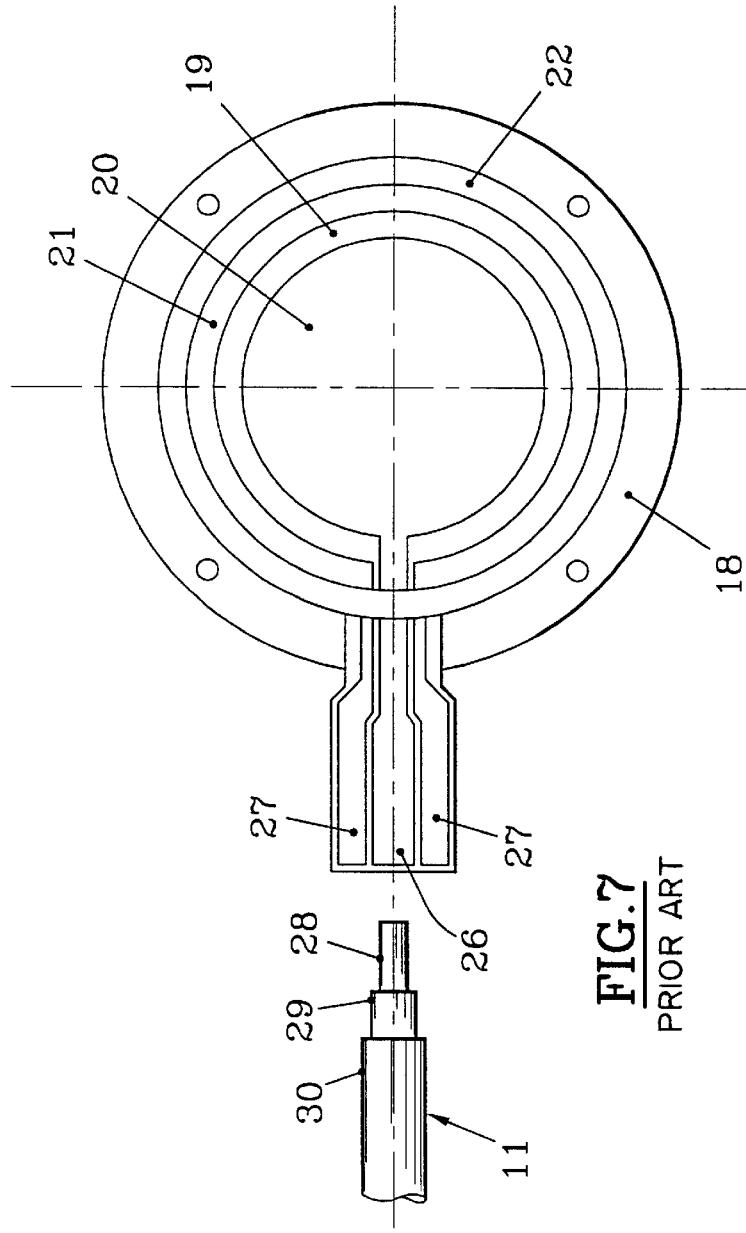
FIG. 7 is a top view of the stack of electrodes of FIG. 6, the cover of the box being removed.

FIGS. 5, 6 and 7 show an embodiment of the sensor of which the type having planar electrodes and the operation principle are well known.

Five electrodes constituted by discs 19 made of a dielectric material, for example, epoxy, and provided with tracks made of copper on their two surfaces, are stacked in a metallic box 18.

More specifically, each disc 19 includes on each surface a central thin copper layer 20 having a circular shape, surrounded by a peripheral annular thin copper layer 21.

Rings 22 made of an insulating material are interposed at the periphery between the discs-electrodes 19, the assembly being enclosed in the box 18 closed by a cover 23 (FIG. 6) made of the same metal, the cover being removed in FIG. 7.

The electrodes are arranged so as to form two parallel ionization chambers, i.e., the two regions between the central disc 19 and the two discs 19 flanking the central disc. The signal collecting electrode, designated by the reference character S in FIG. 5 is connected to the circular layers 20 of the central disc 19, as well as to the internal circular layer 20 of the two external discs 19. As can be noted in FIG. 5, the layers 20 of the three internal discs 19 are joined by connections 24. Similarly, the five discs 19 with the circular layers 21 joined to one another on a same disc by a connection 25. In addition, the external layers 20 of the two external discs 19 are connected to the annular layers 21.

The polarizing voltage of the sensor is applied between the layers 20 of the two discs 19 flanking the central disc 19, (300 volts) on the one hand, and the internal layers 20 of the two external discs 19, (0 volt) on the other hand.

In addition, the 0 volt potential is connected to all of the annular layers 21 of the discs 19 so as to form, in the known manner, guard rings on the electrodes confining, in a precise manner, the field for collecting the electric loads generated during the ionization of the inter-electrode gas which, advantageously, is air.

FIG. 7 shows a top view of the central disc 19 for the stack of FIGS. 5 and 6. All of the discs 19 are physically constituted in the same manner and include, on both surfaces, lateral connections obtained on lugs extending from the discs, namely, a terminal 26 connected to the central layer 20 and flanked by two terminals 27 connected to the annular layer 21.

The triaxial cable 11 is shown whose central conductor 28 will be connected to the terminals 26 of the discs 19 involved in order to collect the signal S, while an intermediate sheath 29 will be connected (0 volt) to the terminals 27 of all discs 19, according to the connection diagram in FIG. 5, and the external sheath 30 will direct an 300 volt potential to the terminal 26 of the discs 19 involved.

Figure 4:
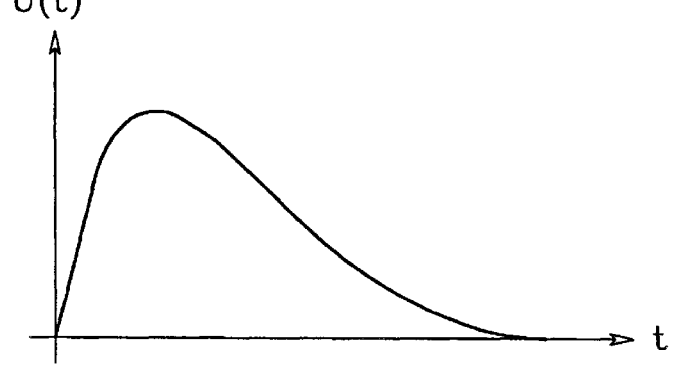
FIG. 4 shows the wave form of the signal collected upon exiting the ionization chamber.

FIG. 4 shows the form of the signal S coming from the sensor, and which is a typical form of a signal generated in an ionization chamber receiving an X-ray radiation.

This signal is characterized by a short rise time and long drop time.

The sensor provides a very weak current pulse, on the order of $10^{-9}$ ampere.

In the case of X-ray radiation, this current can be expressed in the following form:

$$I = \frac{K \cdot v \cdot p \cdot D}{1.08} \times 10^{-13}$$

The current I is here expressed in ampere, K being the constant characterizing the gas used in the ionization chamber (K being equal to 1 for air), v being the useful volume in $cm^3$, p the gas pressure expressed in atmosphere (atmospheric pressure in the case of the present sensor) and D being the dose rate in roentgen/hour.

Therefore, the sensor provides a qualitative value of the dose rate which can be quantified subsequently.

The current from the sensor 7 is directed by the triaxial cable 11 to the circuit 12 where it is transformed into voltage by conversion and amplification. The voltage signal obtained is then integrated in order to know the mean value that can then be visualized, displayed and recorded by appropriate exploitation means (16, 17).

All of the apparatuses and devices for amplifying and processing the signal S delivered by the sensor 7 are located in the neutral zone 9 and, therefore, are not disturbed by the interferences generated in the zone 8.

FIG. 3 illustrates an embodiment of the device for implementing the improved method of the invention.

The sensor, designated by reference numeral 7', is connected by a triaxial cable 11' to an assembly 31 for processing the signal located in the neutral zone including especially a circuit 32 for amplifying and converting the current signal into a voltage signal, an integrating circuit 33 connected to a micro-computer 34, a high-voltage supply 35 and, a low-voltage supply 36.

The micro-computer 34 is, for example, an IBM PC 386-SX and is used with an acquisition card, such as the Lab PC+ card by National Instruments, converting the analog signals into digital signals and managing them.

The card is managed by appropriate management software.

The management software, in a general manner, fulfills two types of functions, namely, secondary functions for monitoring the supplies 35 and 36, directing the signal and conducting the verification test, as well as main functions such as defining a measuring task, calculating the average dose and, calculating the difference-dose function, history of test campaign.

Advantageously, as also shown in FIG. 3, the device can be interfaced with the computerized assembly piloting the installation of irradiation polymerization and especially managing the electron gun 1 and the means for displacing the element 6 being treated (see EP 0.165.118).

In FIG. 3, the reference numeral 1 symbolizes the electron gun, 37 symbolizes the computer for controlling the latter, and 38 sumbolizes a pilot device.

The device 38 receives the measurement of the dose rate from the micro-computer 34, compares it to the reference dose rate provided by the computer 37 controlling the gun 1.

The pilot device 38 provides the gun 1 with a control signal with appropriate power.

Furthermore, the gun 1 is connected to the integrator 33 in order to furnish synchronizing pulses (reset to zero RTZ), i.e., for the acquisition of a measurement at each pulse of the gun 1.

Thus, the device of the invention can control step by step, during the running of the program or polymerization cycle, the development of the dose rate, compare it to a pre-established development program and possibly intervene, in the case of a dose rate different from the pre-established value due, for example to a variation in the operating mode of the gun 1, to act for compensation purposes and to have the optimum local irradiation dose. Such a reaction is possible because the measurement is instantaneous, and the action on the generator has immediate effects that are applied to the desired location since the irradiation of a surface is carried out by irradiating the same surface several times.

The sensor 7 or 7' is advantageously positioned in the backscattering lobe 5 of the target 3 (FIG. 2), for example, with the plane of the electrodes substantially in the plane of the target.

The sensor can nevertheless be placed in other positions with respect to the target, for example, at the front of, beneath or above the target.

In the absence of calibration of the measuring signal, the device only provides an approximate evaluation which, however, is sufficient to ensure good repeatability. Of course, if greater dose rate accuracy is necessary, a prior calibration of the device would be undertaken.

One can thus verify that during the irradiation process, the development of the values of the dose rates thus "measured" is within a value range that substantially follows the profile of the irradiation curve (polymerization cycle), which is calculated from charts, in the usual manner, as a function of the geometry and nature of the element and as a function of the selected "overdosage" coefficient, etc.

The X-ray scanning of the element (6) to be treated is done lengthwise, once, or after several passes, the element (6) being rotationally driven about its axis.

It must also be noted that the sensor 7 or 7' can be used to measure electron radiation dose rates, the target 3 being retracted. The metallic box of the sensor, preferably made of tungsten, serves as a target generating a secondary X-ray radiation proportional to the power of the electron beams, and which will be detected by the sensor.

Finally, the invention is, of course, not limited to the embodiments described hereinabove, but rather encompasses all of the variations thereof, especially with respect to the structure of the ionization chamber whose electrodes could be cylindrical, for example. The connection means between the ionization chamber and the circuits for processing the signal delivered by the chamber, located in a neutral zone, may also be varied. For example, two shielded coaxial cables could be used instead of the triaxial cable 11, 11'.

The method of the invention applies likewise to the control of the dose rate of the photon or electron radiation from an electron gun, adapted to the sterilization of foodstuffs, objects and instruments especially intended for medical use.

The method enables, in particular, an instantaneous and automatic control of the reception, for example, on a sterilization conveyor chain on which packs or assemblies of objects or products move continuously, of the necessary and sufficient quantity of ionizing particles. To this end, it suffices to verify that each object has received a dose between a minimum and a maximum that are predetermined and displayed in the control installation using the method of the invention.

The instant application is based upon French Patent Application No. 95.06932, filed on Jun. 7, 1995, the disclosure of which is hereby expressly incorporated by reference thereto in its entirety and the priority of which is claimed under 35 USC 119.

What is claimed is:

1. A method of real time control of a dose rate of particles or ionizing radiation generated by an electron gun and applied to polymerization of resins of one of elements and structures made of composite materials, said method comprising:

sampling continuously, by use of an ionization chamber having planar electrodes, placed in a field of the particles or ionizing radiation, a load-collecting current between the electrodes, so as to obtain a representation of an instantaneous dose rate of the particles or ionizing radiation;

directing, by use of a shielded conducting system, said collecting current to an amplification and measurement system arranged outside of an irradiation zone;

converting intensities of the load-collecting current into dose rate values;

comparing detected dose rate values with predetermined dose rates according to an irradiation cycle established as a function of the one of elements and structures to be treated;

detecting possible differences between the predetermined dose rates and the detected dose rates, greater than predetermined threshold; and from the detection of possible differences, controlling the electron gun so as to compensate, automatically and immediately, for temporary variations in functioning of said electron gun.

2. The method of claim 1, wherein said ionizing radiation comprises X-ray radiation.

3. The method of claim 1, wherein the composite material which is exposed to the radiation comprises at least one member selected from the group consisting of resin-impregnated mineral and synthetic fibers.

4. The method of claim 1, wherein the dose rate is varied during exposure of the composite material to radiation.

5. The method of claim 1, wherein the irradiation cycle comprises an irradiation curve which is calculated from charts.

6. A device for real time control of a dose rate of particles or ionizing radiation generated by an electron gun and applied to polymerization of resins of one of elements and structures made of composite materials, said device comprising:

an ionization chamber having planar electrodes, the chamber being connected, by use of a shielded conducting device, to both an exploitation device and an assembly for amplifying-processing a load-collecting current;

said ionization chamber further comprising a stack, in a metallic box of five discs made of a dielectric material, the discs having two surfaces on which are provided metallic coatings defining circular electrodes and peripheral guard rings, the electrodes being connected so as to comprise two parallel ionization chambers, the electrodes for handling the load-collecting current each being across from an electrode brought to a potential of several hundred volts, and electrodes brought to a zero potential being arranged on external discs.

7. The device of claim 6, wherein the shielded conducting device comprises a triaxial cable, and wherein electrodes for handling the load-collecting current are connected to a central conductor of said triaxial cable, electrodes having a high potential are connected to an external sheath of said triaxial cable, and electrodes with zero potential are connected to an intermediate sheath of said triaxial cable.

8. The device of claim 6, wherein the metallic box of the ionization chamber is made of tungsten.

9. The device of claim 6, wherein said exploitation device comprises at least one of a display/visualization device and a recording device.

10. The device of claim 6, wherein said exploitation device comprises:

a computerized system including a first computer having a data acquisition card; and a pilot device connected to said computerized system and to a second computer for controlling said electron gun, the second computer sends to the electron gun a power control signal as a function of a difference between a dose rate measurement provided by said computerized system and a reference delivered by said second computer.

11. The device of claim 10, wherein said electron gun is connected to said assembly for amplifying-processing the load-collecting current to control acquisition of a dose rate measurement at each pulse of said electron gun.

12. A method of real time control of a dose rate of particles or ionizing radiation generated by an electron gun and applied to polymerization of resin composite materials, said method comprising:

providing an electron gun and a radiation sensor in an irradiation zone;

irradiating a resin composite material in the irradiation zone to polymerize the resin composite material;

connecting the radiation sensor with a controller in a neutral zone outside of the irradiation zone;

sensing radiation in the irradiation zone by use of the radiation sensor on a continuous basis; and controlling a radiation output generated by use of the electron gun on a continuous basis by use of the controller as a function of sensed radiation.

13. The method of claim 12, wherein the controlling step further comprises programming a predetermined dose rate according to an irradiation cycle, determining a difference between the predetermined dose rate with the sensed radiation, and controlling the radiation output of the electron gun as a function of the difference between the predetermined dose rate and the sensed radiation.

14. The method of claim 12, wherein the connecting step involves a shielded cable connecting the radiation sensor and the controller.

15. The method of claim 12, wherein the radiation output polymerizes a resin.

16. The method of claim 15, wherein the resin forms a portion of a composite material.

17. The method of claim 12, wherein the sensor comprises an ionization chamber having parallel electrodes.

18. The method of claim 12, wherein the resin composite material which is exposed to the radiation comprises at least one member selected from the group consisting of resin-impregnated mineral and synthetic fibers.

19. The method of claim 12, wherein the dose rate is varied during exposure of the resin composite material to radiation.

20. The method of claim 12, wherein the irradiation cycle comprises an irradiation curve which is calculated from charts.

* * * * *